E. R. FELLOWS.
METHOD OF GENERATING GEAR TEETH.
APPLICATION FILED MAR. 6, 1915.
1,252,679.
Patented Jan. 8, 1918.
2 SHEETS—SHEET 1.
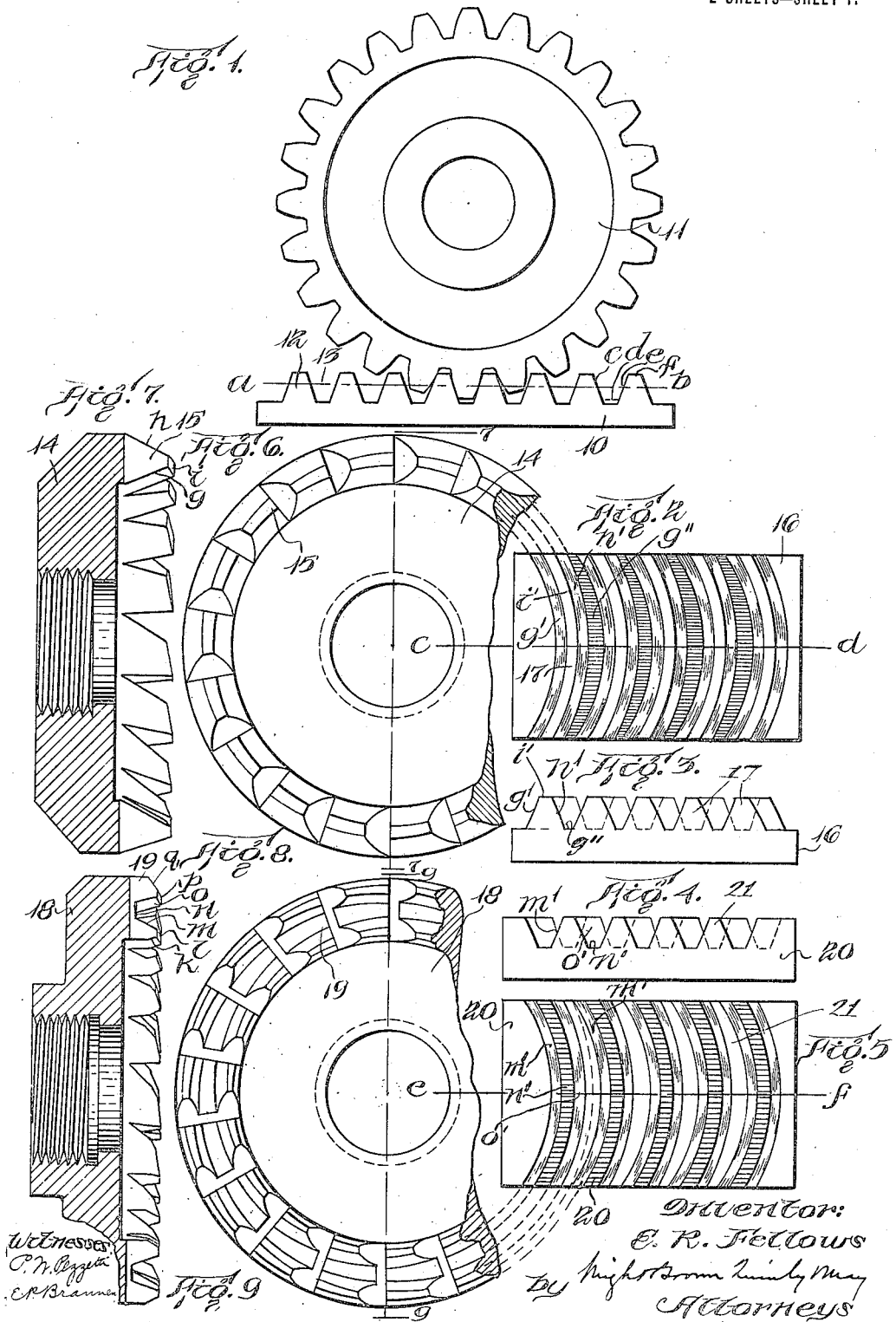

E. R. FELLOWS.
METHOD OF GENERATING GEAR TEETH.
APPLICATION FILED MAR. 6, 1915.
1,252,679.
Patented Jan. 8, 1918.
2 SHEETS—SHEET 2.
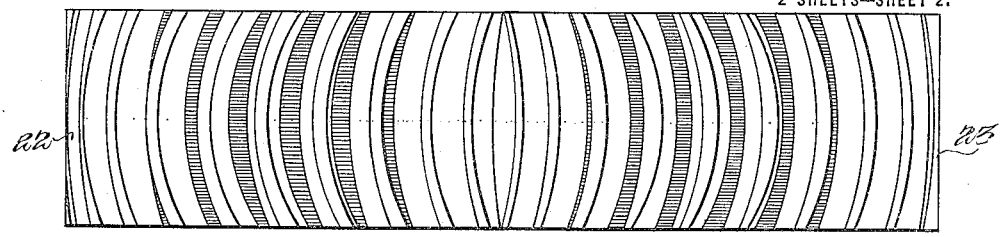
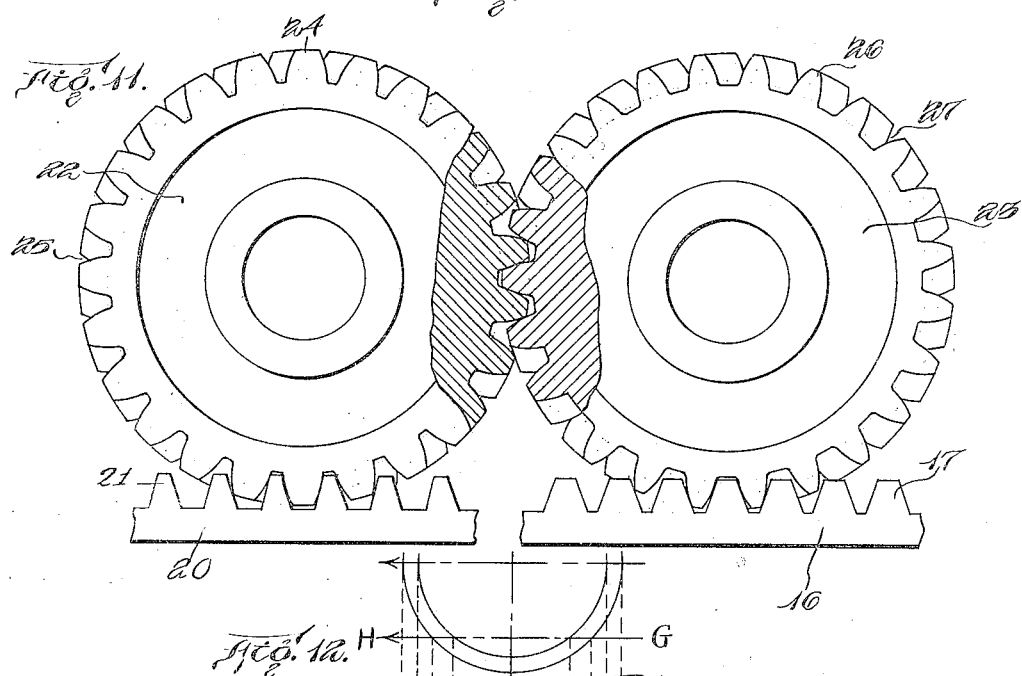

UNITED STATES PATENT OFFICE.

EDWIN R. FELLOWS, OF SPRINGFIELD, VERMONT, ASSIGNOR TO THE FELLOWS GEAR SHAPER COMPANY, OF SPRINGFIELD, VERMONT, A CORPORATION OF VERMONT.

METHOD OF GENERATING GEAR-TEETH.

1,252,679.  Specification of Letters Patent.  Patented Jan. 8, 1918.

Application filed March 6, 1915. Serial No. 12,540.

*To all whom it may concern:*

Be it known that I, EDWIN R. FELLOWS, a citizen of the United States, and resident of Springfield, in the county of Windsor and State of Vermont, have invented certain new and useful Improvements in Methods of Generating Gear-Teeth, of which the following is a specification.

My present invention relates to gearing and methods of producing the same. The object of the invention is to produce accurately, readily, and economically a pair of complemental gears, or a set of interchangeable complemental gears, having teeth which are curved or bowed longitudinally, that is from one bounding limit to the other of the tooth-bearing portion of the gear, which teeth in one gear or in any gear of one set, are complemental to the teeth of the mating gear, or of any gear in the complemental set, not merely approximately but with theoretically absolute accuracy. In carrying this object into effect I have developed a method of generating gears by means of milling cutters having axially projecting teeth which are caused to travel in a plane tangent to the pitch circle or surface of the gear, at the same time that relative generating movements are produced between the cutter and the gear; and a set of cutters complemental to one another which, when employed thus to cut and generate teeth in different gear blanks, will produce gears which are accurately complemental or conjugate to one another, the gears produced by one cutter being conjugate to those produced by the other cutter, although no two gears produced by either cutter are conjugate to each other. When one cutter only of the sort indicated is employed in the manner indicated to cut a succession of teeth in a gear element, there is a lack of uniformity in the width of the teeth, or of the spaces between the teeth, respectively, at different points between their ends; and it is my object to neutralize this lack of uniformity and eliminate any inaccuracy due to the same, in a very simple manner, by providing mating gears, and a method and means for producing such gears, having teeth of the sort described, in which the departure from uniformity in width of the teeth, for instance, of one gear is exactly equal and complementary to the departure from uniformity in width of the spaces between the teeth of the other gear. Accordingly my invention consists in the gearing, the method of producing the same, and the cutting tools used in performing this method, above indicated and hereinafter described, that part of the invention which I claim in this application being the said method.

For the purposes of this description, I will consider the teeth as ribs, and the spaces between the teeth as grooves, having appreciable length, and will call the ends of such ribs and grooves the ends of the teeth and of the tooth spaces, respectively; making this explanation to avoid any confusion which might arise through erroneously considering the outermost limit of the tooth (away from the body axis of the gear) as the end of the tooth. In this description I will call that part of the tooth which joins the body of the gear the "root" of the tooth, and its outermost extremity, the "top," in order to make the avoidance of confusion more complete. The ends of the teeth are thus the intersections of their side and top faces with the planes or other surfaces which bound and limit the portion of the gear in which the teeth are cut.

In the drawings,

Figure 1 is a side view of a complemental rack and pinion, for illustration of the standard and common method of generating gear teeth.

Fig. 2 is a plan view of a form of rack which forms the basis of my new method of gear design.

Fig. 3 is a side view of the rack shown in Fig. 2.

Fig. 4 is a side view of a rack conjugate to that shown in Figs. 2 and 3 but specifically dissimilar therefrom.

Fig. 5 is a plan view of the rack shown in Fig. 4.

Figs. 6 and 7 are respectively a face view and a central cross section of a cutter constructed on the basis of the rack shown in Fig. 2, and complemental to that shown in Fig. 5.

Figs. 8 and 9 are respectively a face view and central cross section of a cutter constructed on the basis of the rack shown in Fig. 5, and complemental to that shown in Fig. 2.

Fig. 10 is a plan view and Fig. 11 is a side view partly in section of a pair of mating gears produced in accordance with my invention.

Fig. 12 is a diagrammatic view illustrating the differing manner of curvature of the faces of the rack teeth shown in Figs. 2 and 5 on the intersections of different planes.

The same reference characters indicate the same parts in all the figures.

As a preliminary to a comprehensible explanation of my invention I will set forth briefly the principles and theory on which the commonly employed method of generating interchangeable gearing is based. Any rack tooth may be used as the basis of an interchangeable set of gearing, provided the teeth and spaces of the rack are equal and symmetrical; or as expressed by the Sang theory each tooth and the adjacent space are "bounded by four similar and equal lines in alternate reversion". If two racks fulfilling these requirements be fitted together, the teeth of one will exactly fit and fill the spaces of the other; one is the complement of the other; and the teeth and spaces will be exactly equal as measured on the pitch line. If a cutting tool having the form of one of these rack teeth, or of one of the tooth faces be made, and employed according to the well known methods of generating teeth, to generate and cut the teeth of a series of gears, all conjugate to the rack, all of such gears of necessity will be conjugate to each other because their teeth mesh perfectly with the same standard rack.

The ordinary form of base rack and of a gear conjugate thereto is shown in Fig. 1. Here 10 represents the rack and 11 the gear. It will be seen that the teeth 12 and spaces 13 of the rack 10 are symmetrical and are equal in width on the pitch line $ab$, each tooth and the adjacent space being bounded by four lines $c$, $d$, $e$, and $f$ of which the lines $c$ and $e$ are equal and are symmetrically arranged and oppositely inclined with respect to the center lines of the teeth and spaces, and the lines $d$ and $f$ are equal and are symetrically arranged on opposite sides of the pitch line. The line $d$ is an imaginary line which represents the theoretical bottom of the space, the space being actually cut beyond this line to give clearance. These four lines follow each other in recurring series throughout the entire length of the rack. Such a rack may be cut with the central planes of its teeth perpendicular to the sides of the rack, in which case it meshes with a spur gear, or with the central planes of the teeth inclined to the sides of the rack, in which case it meshes with a helical gear, but in either case the lines formed by the intersection of a longitudinal plane coincident or parallel to the sides of the rack with the bounding surfaces of the teeth and spaces have the symmetry and equality described.

If the cutter made with teeth like the teeth of this rack be used to cut grooves across the face of a gear blank, and if at the same time generating movements of rotation about the axis of the blank and of translation in a direction parallel to the pitch line of the rack be given to the gear blank or to the cutter or to both the blank and the cutter, so as to simulate the rolling motion of a gear on a rack, such a gear as the gear 11 is produced having teeth which correspond with the teeth of the rack and the faces of which are curves. Gears of all sizes generated on the same system are conjugate to the same rack 10 and therefore have teeth which are equal in width on the pitch line to the spaces of the rack and the faces of which are odontoid curves, and all such gears are conjugate to each other.

I have discovered that it is possible under some conditions to develop a method of gear generation in which the teeth and spaces of the rack to which the gears are conjugate, are bounded by lines or surfaces which are not similar and equal in alternate reversion, and in which the width of the rack and gear teeth on the pitch surface is not uniformly equal to the width, on the pitch surface, of the spaces. I have discovered that if two racks are provided of which the teeth and spaces are relatively unequal as above described, but of which the teeth of one rack fit the spaces of the other rack, so that the racks are exactly complemental, and if the teeth of these racks are taken as the basis for generating the teeth of gears, then all the gears which have the same relation to one of the complemental racks that the standard gear has to the standard rack, as previously described, will be conjugate and complemental to those gears which bear this same relation to the complemental rack, and will mesh perfectly and interchangeably with all of the gears of the second set, although any two gears of either one set are not conjugate to each other. I have found that this statement is true even when the teeth of the racks are not symmetrical, that is, their opposite faces are not similar and equal, provided however the variations from symmetry in the teeth of the two racks are equal and complementary. Any form of rack tooth which may be given to the cutter teeth and will not cause undercutting or interference in the process of generation, may serve as the basis of a set of gears made under my method.

The principle underlying my invention may be stated thus: Gears conjugate to any form of conjugal rack are conjugate to other gears which are conjugate to the complement of such rack. In this statement I consider as a "conjugal" rack, any rack such as I have last described which is non-uniform either as to the relative widths of its teeth and spaces, or the form of its teeth, or both, at any or all points between the ends of such teeth and spaces and is complemental to another rack in which the departures from uniformity are exactly the reverse.

The conjugal or complemental racks which form the basis of a system of gearing made according to my invention are shown in plan view in Figs. 2 and 5, and in elevation in Figs. 3 and 4, respectively. Figs. 6 and 7 show a cutter 14 based on the rack of Figs. 2 and 3 adapted to generate and cut teeth in a spur gear of any size conjugate to this rack; while Figs. 8 and 9 show the cutter based on the rack of Figs. 4 and 5 and adapted to cut spur gears conjugate to the latter rack.

I can most quickly and easily explain the characteristics of the racks by describing the cutters. The cutter 14, shown in Figs. 6 and 7 is a disk adapted to be mounted on a shaft so as to rotate about its axis, and it has teeth 15 projecting axially from one face and arranged concentric with the axis of the disk. It is essentially a milling cutter of which the teeth 15 are segments of an axially projecting annular rib. Each tooth has side cutting edges $g$ and $h$ inclined equally toward a center line parallel to the axis of the cutter, and an outer edge $i$; such edges together forming the outline of the rack tooth which is adopted as the standard. The relation between the cutter teeth and the standard rack tooth is clearly shown by the dotted lines between Fig. 6 and Fig. 2 which connect the angles of one of the teeth 17 of rack 16 with the teeth of the cutter.

The complemental cutter 18 of Figs. 8 and 9 has an annular, axially-projecting series of teeth 19 each of which is formed with a notch bounded by cutting edges $m$ and $o$, inclined similarly and oppositely to the edges $g$ and $h$ of tooth 15, and a bottom edge $n$ equal in width to the outer edge $i$ of tooth 15. The center line of this notch is at the same distance from the axis of the cutter as the center line of tooth 15 from the axis of cutter 14. In addition, tooth 19 has outer edges $l$ and $p$ on opposite sides of the notch, and beveled edges $k$ and $q$. The faces $m'$ and $o'$ of adjacent edges of the standard rack 20 (Fig. 5) correspond to the edges $m$ and $o$ of the tooth 19, and the bottom surface $n'$ of the groove between the rack teeth to the edge $n$.

When the cutter 14 is employed to mill a bar of stock, being fed into the stock to the required depth at each operation, and the stock is moved between cutting operations the proper distance for spacing, it will produce the rack 20, forming the conical surfaces $m'$ and $o'$ and the bottom surface $n'$ of each tooth space by means of its cutting edges $g$, $h$ and $i$ respectively. The grooves or tooth spaces so cut are curved and are of uniform radial width from end to end, because the bounding walls of each groove are produced by the revolution of the cutter teeth 15 about the axis of the cutter; but the tooth 21 between such spaces is of varying width from end to end, having its greatest width in the line radial to the cutter which extends in the direction of indexing movement (line $e$—$f$ of Fig. 5), and gradually diminishing in width to each side of such line, because the grooves on each side of the tooth are cut on different centers, and the surface $m'$ on the convex side of the tooth is of shorter radius than the surface $o'$ on the concave side of the tooth.

Similarly the cutter 18 is adapted to produce the rack 16, the blank being moved the same distance between cutting operations as the blank from which the rack 20 is made. The sides $g'$ and $h'$ of each rack tooth 17 are formed by the edges $m$ and $o$ of the cutter teeth 19, and that portion of the bottom surface $q''$ of the groove between the rack teeth which adjoins the convex face $h'$ is finished by the edge $p$ of the cutter teeth, the balance of such bottom surface (adjoining the concave face $g'$ of the next rack tooth) being finished by the cutting edge $l$ on the next succeeding cut. The rack teeth 17 are of uniform width (in lines radial to the center of longitudinal curvature) from end to end, while the spaces between such teeth are non-uniform in width in the same character and degree as the teeth of rack 20. Thus the teeth of each rack are exactly equal and complemental in dimensions, form, and spacing to the spaces between the teeth of the other, and each rack is the complement of, or conjugate to, the other rack.

In section on the lines $c$—$d$ and $e$—$f$, that is lines radial to the cutters and extending in the direction of indexing movement of the rack bars between cutting operations, the rack teeth and spaces are of uniform proportions and have the same form as in the standard rack of similar angle; but on any section line parallel to the lines $c$—$d$ and $e$—$f$ respectively, the teeth and spaces are of non-uniform proportions, with unequal angles between their opposite faces and the vertical, and with diverse forms; one face being convex and the other concave. The reason for this variation is explained by the fact that the faces of the rack teeth are zones of cones and the intersections of such teeth with the planes above referred to are conic sections. Reference to the diagram in Fig. 12 will assist in this explanation. If the cones A, B, C, and D, E, F, are constructed by completing the surfaces which form the convex and concave faces of one of the rack teeth, and these surfaces are cut by a plane G, H, parallel to the axes of the cones, and corresponding to the plane of one edge of the rack, the conic sections so produced are the hyperbolas K and L and the faces of the teeth in this plane are segments of these hyperbolas.

The spur gears 22 and 23 shown in Fig. 10 represent gears which are made conjugate to one another on a system of which the racks 16 and 20 are the basis. If the cutter 14 is used to mill a groove across the peripheral face of the spur gear and at the same time relative generating movements of the same sort as the movements which occur when a pinion is rolled on a rack are given to the gear blank or to the cutter or to both, such a gear as the gear 23 is produced which, as its teeth are complemental to the teeth of the cutter 14, is evidently conjugate to the rack 16. Similarly the cutter 18 is adapted to form the teeth of such a gear as the gear 22, which teeth are conjugate to the rack 20 and are adapted to make proper rolling mesh therewith. These gears therefore fulfil the condition heretofore stated, that "gears conjugate to any form of conjugal rack are conjugate to other gears which are conjugate to the complement of such rack," and are thus conjugate to each other. All gears thus generated and cut by the cutters 14 and 18 will be conjugate to each other and form a set of interchangeable gears. The teeth of the gears 22 and 23 have essentially the same characteristics as the teeth of the racks, already fully described, with the modification which follows from the generation of the teeth in a curved surface instead of in a plane surface.

The essential invention which is contained in the embodiment of the same hereinbefore described is not necessarily limited to consist of spur gears and to the method of producing them, since it may be applied to bevel gearing. The basis of a system of bevel gears is a crown gear having radial teeth all in the same plane perpendicular to the axis of the gear. Such a gear may be considered as composed of an infinite number of racks of infinitesimal thickness curved transversely into cylindrical form and placed one within another so that all are concentric to the axis of the gear and the pitch lines of all form concentric circles in a plane perpendicular to the axis of the gear. The teeth of such imaginary racks have the characteristics of the teeth of a straight rack in spite of the fact that the line of teeth is deflected laterally from a plane into a cylindrical surface, wherefore it follows that the principles herein explained may be applied to generating conjugate bevel gears having teeth which are curved from end to end, but with this modification that as the teeth, and the grooves between the teeth of a beveled gear are necessarily wider at their outer ends, that is the ends most remote from the axis, than at their inner ends, the cutters employed to generate curved teeth are designed to shape only one face of a tooth, or one side of a tooth groove at each cutting operation. That is, for example, the cutter which corresponds to the cutter 14 must have teeth no wider than the narrower end of the space between teeth of the gear, although with the edges of its teeth conforming to the base rack teeth; and the cutter which corresponds to cutter 18 must have the notches in its teeth wider than the widest parts of the gear teeth, and the cutting parts bounding such notches thinner than the small ends of the gear tooth spaces. The center of the cutting head is set first correctly for cutting one side of the gear tooth; and then, after completing this side of all the teeth of the gear, is shifted to bring the opposite side of the cutter tooth in the proper relation to the first cut. The latter setting must be made so that the gear tooth, or the space, as the case may be, has the proper thickness at each end. And the same effect may be secured by using two cutters for each gear, said cutters having teeth representing respectively the outer and inner halves of the teeth of the cutters, 14 and 18 respectively, and operated according to the first and second settings above described. Such cutters and the results accomplished thereby conform to the principles explained in this specification, in that the cutters correspond to the outlines of complemental or conjugate base racks.

My invention involves both a set of gears and a method of producing such a set of gears. So far as I am aware it is novel with the present invention to generate conjugate gear teeth by means of complementary annular cutters, each rotating in a plane tangent to the pitch surface of the gear which it is designed to cut. Accordingly I include as part of my invention a set of milling cutters for gear generation having annularly arranged axially projecting teeth of which the cutting edges are opposite and complemental to one another.

Gears produced according to my method are quieter in operation than ordinary spur gears owing to the bowed formation of their teeth and to the fact that the teeth therefore come into mesh gradually instead of suddenly, and they may be more easily and economically produced than gears having spiral or herringbone teeth.

The foregoing description and the following claims are to be read with the understanding that I am here dealing with the fundamental principles involved, and have not thought it necessary to go in detail into the slight departures from theoretical principles which are usually made in practice in the cutting of gears to secure clearance and avoid interference, etc. In order to produce in practice correctly and smoothly intermeshing gears by the principles herein set forth, the teeth of either or both of the cutters are, or may be, given such extensions, and modifications or corrections in form, from the forms of exactly complemental base rack teeth, as may be found necessary for the purpose indicated, according to well understood principles. Therefore, I wish to make it clearly understood that in describing the cutters as complemental to each other I have not intended to limit the invention to the condition in which the cutters are exactly geometrically complemental, or to exclude such variations as may be necessary for the purposes above noted; but that I include any cutters, and the use of such cutters, however they may vary in minor details, provided they follow in general the essential principles hereinbefore explained.

It will be understood from the foregoing explanation that I do not limit the invention to the step of cutting both faces of a gear tooth, or both faces of the groove between adjacent teeth in one operation by means of cutters having cutting edges which conform to the entire rack tooth or to the entire space between adjacent rack teeth; for it is equally within my contemplation to form one side of a tooth in one cutting and generating operation, and to form the other side of the same tooth by a second cutting and generating operation; and similarly to form the opposite faces of each tooth space in the complemental gear by separate cutting and generating operations. To explain more fully, it is within my contemplation to cut one face of each of the teeth in the gear 22 by a cutter having edges corresponding to the edges $l$, $m$ and $n$ of the cutter 18 and the sides of the same teeth by a cutter having edges corresponding to the edges $n$, $o$, and $p$ of the same cutter; and similarly to cut one side of each of the tooth spaces in the gear 23 by a cutter having edges similar to the edges $g$ and $i$ of the cutter 14, forming the opposite faces of the same grooves by means of a cutter having edges corresponding to the cutting edges $i$ and $h$ of the cutter 14.

What I claim and desire to secure by Letters Patent is:

1. The method of producing a set of interchangeable conjugate gears having curved teeth, which consists in forming the teeth in the gears of one series conjugate to the spaces between teeth of a base rack having curved teeth, and forming the tooth spaces in the gears of a second series conjugate to the teeth of a second base rack which is complemental or conjugate to the first named base rack.

2. The method of producing conjugate gears which consists in causing a cutting element which has a cutting edge corresponding to the side of a base rack tooth to travel in a curved path across the tooth-bearing part of one of such gears in a plane tangent to the pitch surface of the gear, and at the same time producing generating movements between the cutter and gear, indexing the gear blank and repeating such cutting and generating movements; and cutting conjugate teeth in a complemental gear by a similar succession of similar relative movements between the conjugate blank and a gear cutting element having edges complemental to the edge of the first cutting element.

3. Cutting mating gears by rotating a cutting element having the form of a rack tooth across the face of a gear blank in a plane tangent thereto, at the same time producing a rolling generating movement between the gear blank and cutter, continuing and repeating the cutting operation in different locations spaced the required distance apart about the circumference of the blank, and performing like operations in the same manner on a second gear blank by means of a cutting element having a contour complemental to that of the first cutting element.

4. The method of producing conjugate gears having curved teeth, which consists in causing a cutter in the form of a rack tooth to travel in a curved path across the face of one gear blank in a plane tangent to the pitch surface of the blank and producing a rolling generating relative movement between the cutter and blank, and causing a cutter having edges defining a space complemental to the first cutter to travel in the same manner with respect to a second gear blank, and producing a rolling generating relative movement between the second named cutter and the second blank.

5. The method of producing interchangeable conjugate gears which consists in generating in one gear blank a succession of teeth which are conjugate to a base rack having teeth curved from end to end, and generating in the complemental blank a series of teeth which are conjugate to a base rack having spaces curved from end to end complemental to the teeth of the first base rack.

6. The method of producing a pair of mating gears which consists in cutting and generating curved grooves in the tooth bearing portion of one gear blank complemental to the teeth of a base rack in which the teeth are curved from end to end; and generating curved teeth in the tooth-bearing portion of the other blank complemental to the grooves of a second base rack which is the complement to the first base rack.

7. The method of producing conjugate gears of which the teeth and spaces in each gear are relatively non-uniform in width on the pitch surface, which consists in generating the teeth of the gears respectively conjugate to base racks which are complemental to one another and are non-uniform.

8. The method of producing accurately mating gears having variations from equality between the width of their teeth and spaces on their pitch lines, which consists in cutting the teeth of one gear of a pair of mating gears by means of a cutter having teeth in the form of the teeth of a base rack, and producing generating rolling movements between the gear and cutter during the cutting operation, indexing the gear the required angular distance between successive cutting operations, and cutting the teeth of the complemental gear of the pair by a cutter of which the teeth have the form of the groove between the teeth of a complemental base rack, and giving the same generating and indexing movements to the second gear during and between the cutting operations upon the same.

9. The method of producing conjugate gears having teeth curved from end to end which consists in forming the teeth of one gear conjugate to the spaces between curved teeth of a rack in which such spaces are of uniform radial width from end to end, and forming the tooth spaces in the complemental gear conjugate to the curved teeth of a second rack which are of uniform radial width from end to end and are complemental to the tooth spaces of the first rack.

In testimony whereof I have affixed my signature, in presence of two witnesses.

EDWIN R. FELLOWS.

Witnesses:
  E. W. MILLER,
  R. M. FELLOWS.